United States Patent [19]
Radkowsky

[11] 3,885,156
[45] May 20, 1975

[54] NEUTRONIC FLOW METER
[75] Inventor: Alvin Radkowsky, Tel Aviv, Israel
[73] Assignee: The United States of America as represented by the Energy Research and Development Administration, Washington, D.C.
[22] Filed: May 23, 1974
[21] Appl. No.: 472,931

[52] U.S. Cl. .............. 250/303; 250/360; 250/391; 250/432; 250/499
[51] Int. Cl. .............................................. G01t 1/16
[58] Field of Search .......... 250/356, 392, 504, 303, 250/360, 391, 432, 499

[56] References Cited
UNITED STATES PATENTS

| 2,287,619 | 6/1942 | Kallmann et al. | 250/501 |
| 2,953,681 | 9/1960 | Frazier | 250/356 |
| 3,009,062 | 11/1961 | Brookbank | 250/392 |
| 3,239,663 | 3/1966 | Oshry et al. | 250/356 |
| 3,577,158 | 5/1971 | Hahn | 250/356 |

Primary Examiner—Harold A. Dixon
Attorney, Agent, or Firm—Dean E. Carlson; Kenneth L. Cage; John A. Koch

[57] ABSTRACT

A neutronic flow meter which uses a neutron source surrounded by a moderator at cryogenic temperatures and neutron detectors located upstream and downstream of the source to measure the fluid flow rate through a pipe and alternately a ships speed.

7 Claims, 4 Drawing Figures

NEUTRONIC FLOW METER

BACKGROUND OF THE INVENTION

The invention described herein was made in the course of, or under, employment with the U.S. Atomic Energy Commission.

FIELD OF THE INVENTION

This invention relates to a method and apparatus for measuring the mass flow rate of the fluid material—that is a gas or a liquid. In particular this invention relates to a mass flow rate measuring method and apparatus using a neutron source surrounded by a cryogenically cooled moderator and a pair of neutron detectors positioned on opposite sides of the neutron source.

DESCRIPTION OF THE PRIOR ART

The invention in one of its typical uses accurately measures the mass flow rate of a fluid within a pipe or conduit by simple and economical means. Typical prior art approaches include U.S. Pat. No. 3,577,158 issued to Linus K. Hahn on May 4, 1971 for hydrogenous fluids, U.S. Pat. No. 3,239,663 issued to H. I. Oshry, et al., on Mar. 8, 1966 using neutron activation of oxygen and U.S. Pat. No. 2,826,700 issued to D. E. Hull on Mar. 11, 1958 using injection of radioactivity into the fluid stream.

SUMMARY OF THE INVENTION

A fluid flow measuring method and apparatus comprises a neutron source surrounded by a moderator maintained at cryogenic temperatures spaced near the pipe carrying fluid with neutron detectors located up stream and down stream of the source. Inasmuch as the diffusion length in a moving fluid is different from that in a stationary fluid, the rate of which the neutron density falls off from the source changes the diffusion length. As neutrons from the source have their velocity lowered by the approximately 4° Kelvin moderator, the effect of the change in the diffusion length is magnified so as to permit calculation of the speed of the fluid traveling through a pipe.

Therefore, it is the primary object of this invention to provide a method and apparatus for measuring fluid velocity through a pipe.

A further object of the invention is to provide a method and apparatus for measuring the speed of a ship passing through water.

DESCRIPTION OF THE PREFERRED EMBODIMENT

Figure 1:
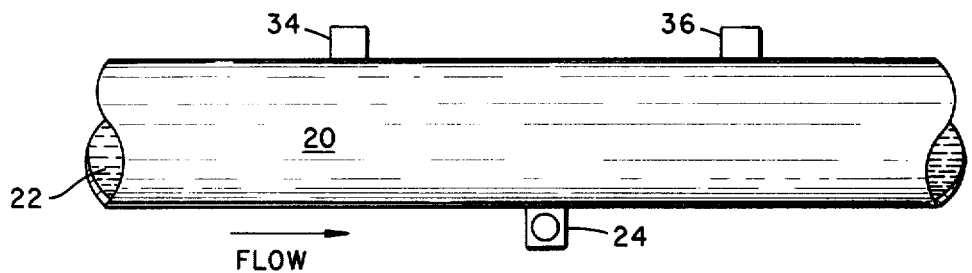
FIG. 1 is a schematic diagram of the neutronic flow meter located external to the pipe wall.
Figure 2:
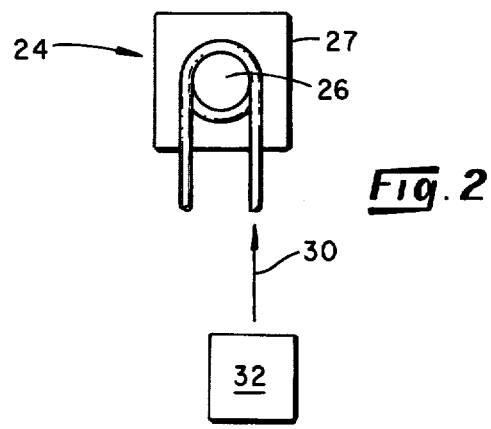
FIG. 2 is an enlarged schematic diagram of the neutron source assembly detail.

The inventive method and apparatus for measuring fluid velocity through a pipe can best be understood by a reference to the above-identified drawings. Referring to FIG. 1, a pipe 20 having fluid 22 flowing in the direction as indicated by the arrows has a neutron source assembly 24 attached to the bottom of the pipe wall. As shown in FIG. 2 the neutron source assembly 24 of FIG. 1 comprises a neutron source 26 is centrally located in a container 27 and surrounded by a moderator (such as plastic) which is cooled by cooling fluid 30 from a cryostat 32. The neutron source may be PuBe, PoBe, RaBe, or $C_f$ 252 and must have a strength of at least $10^5$ neutrons/second. The invention uses the little used effect, namely that the diffusion length in a moving fluid is different from that in the stationary fluid. Hence the diffusion length measures the rate at which neutron density falls off from a source. See the Russian article "Diffusion of Neutrons in a Mobile Median," ATOMNAYA ENERGIYA Volume 14, 2 Feb. 1963, page 218 by A. A. Kostritsa.

Accordingly, the diffusion length (L) in a moving fluid varies with the speed of the fluid approximately according to the following formula.

$$L = L_0 \left(1 - \frac{L_0}{D}\frac{u}{v}\right)$$

where:
$L_0$ is the diffusion length at zero fluid velocity,
$D$ is the diffusion coefficient,
$u$ is the velocity of the fluid which we are trying to measure, and
$v$ is the average neutron velocity in the field.

As noted in the Kostritsa article the change in diffusion length is very small at room temperatures. For example, at a water velocity as high as 90 ft/sec. the change in diffusion length would only be about 10%. By lowering the neutron velocity through cooling a moderator surrounding the neutron source to cryogenic temperatures, the effect can be greatly magnified. Hence, the neutron source 26 is surrounded by the moderator (such as plastic) located in container 27 and cooled to approximately 4° Kelvin to moderate the neutrons admitting from the source so as to slow the velocity of the neutrons coming out of the plastic. Cryogenic devices suitable for this purpose are described in "Cryogenic Research and Applications," Marshall Sittag, D Van Nostrand Co. Inc., 1963 and "Applications of Cryogenic Technology," R. W. Vance and H. Weinstock, Tinnon-Brown Inc., 1969. The cooled moderator significantly lowers the velocity of the neutrons coming out of the plastic. By locating a neutron detector 34 a small distance up stream from the source 24 and another neutron detector 36 an equal distance down stream from the source 24, a difference in the reading in the two detectors is readily noticed. This difference between the two readings of the detectors would be approximately proportional to ux/vD for small values of x. By simple straight forward calculus the optimum value of x would be about a diffusion length ($L_0$). This makes it possible to measure accurately velocities down to several feet per second. The only correction necessary would be to compensate for the temperature of the water (see above-referenced Kostritsa article) as this would affect the value of D in the above formula.

Figure 3:
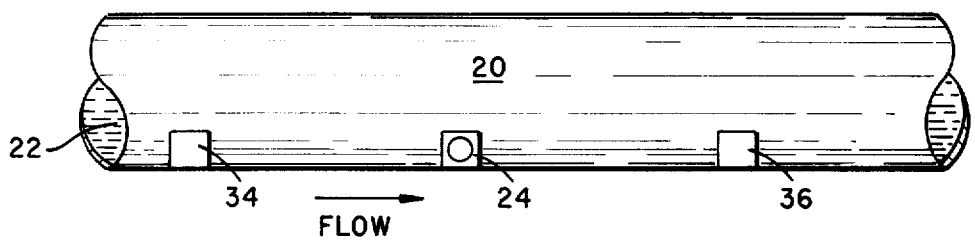
FIG. 3 is a schematic diagram showing an alternate arrangement of the neutronic flow meter located internal to a pipe.
Figure 4:
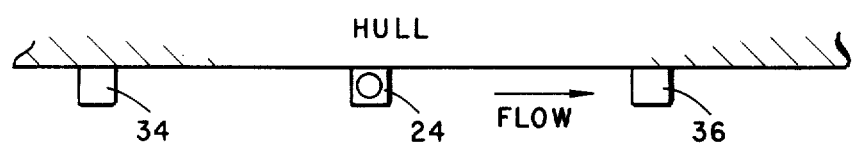
FIG. 4 is a schematic diagram of the flow meter used to measure a ships speed.

An alternate arrangement of the inventive neutron detector internal to the pipe is shown in FIG. 3. In addition an alternate arrangement for measuring a ships speed is also shown in FIG. 4.

Thus, I have described a method and apparatus for measuring fluid velocity in a pipe which accomplishes the object of this invention. It is to be understood the

I claim:

1. An apparatus for measuring the mass flow rate of a fluid comprising a neutron source embedded within a moderator, said moderator being in contact with a cryogenic cooler disposed to lower the temperature of said moderator to at least 4° Kelvin, and a pair of neutron detectors spaced up stream and down stream of the neutron source, whereby a neutron difference reading between the detectors can be utilized for determining the flow rate of a fluid.

2. The apparatus defined in claim 1, wherein the fluid is flowing in a pipe and the neutron source moderator and neutron detectors are external to the pipe.

3. The apparatus defined in claim 1, wherein the fluid is flowing in a pipe and the neutron source, moderator and neutron detectors are within the pipe.

4. The apparatus defined in claim 1, wherein the neutron source is selected from the group consisting of PuBe, PoBe, RaBe, or $C_f 252$ having a strength of at least $10^5$ neutrons/second.

5. The apparatus defined in claim 1, where the moderator is plastic.

6. A method of measuring mass flow rate of a fluid comprising the steps of:

a. radiating the fluid with neutrons from a neutron source embedded in a moderator, said moderator cooled to at least a temperature of 4° Kelvin by a cryogenic cooler, b. detecting the emitted neutrons by a pair of neutron detectors, one located up stream from the neutron source and the second located down stream, and c. calculating the fluid velocity by using the formula, $$L = L_o \left(1 - \frac{L_o\, u}{D\, v}\right)$$

where:
$L_o$ = the diffusion length
$D$ = diffusion coefficient
$u$ = velocity of the fluid
$v$ = the average neutron velocity, and d. compensating for temperature.

7. The apparatus defined in claim 1, wherein the neutron source, moderator, and neutron detectors are located on an external underwater surface of a hull of a ship for measuring ship speed.

* * * * *